United States Patent [19]

Hamaguchi et al.

[11] Patent Number: 5,422,867
[45] Date of Patent: Jun. 6, 1995

[54] ACCESS CONTROL CIRCUIT FOR USE IN OPTICAL DISK UNIT

[75] Inventors: Shingo Hamaguchi; Yasuyuki Ozawa; Shinichi Ohtsuka, all of Kawasaki, Japan

[73] Assignee: Fujitsu Limited, Kawasaki, Japan

[21] Appl. No.: 111,551

[22] Filed: Aug. 25, 1993

[30] Foreign Application Priority Data

Sep. 17, 1992 [JP] Japan ................. 4-247830

[51] Int. Cl.6 ........................................... G11B 7/085
[52] U.S. Cl. ...................................... 369/32; 369/44.29
[58] Field of Search ............... 369/32, 44.28, 44.27, 369/44.29; 360/77.03, 78.06, 78.04, 77.01, 77.02, 77.08

[56] References Cited

U.S. PATENT DOCUMENTS

| | | | |
|---|---|---|---|
| 4,931,889 | 6/1990 | Osafune | 369/32 |
| 5,146,440 | 9/1992 | Yamaguchi et al. | 369/32 |
| 5,182,736 | 1/1993 | Yanagi | 369/32 |
| 5,191,566 | 3/1993 | Yamaguchi et al. | 369/32 |
| 5,216,647 | 6/1993 | Kitani | 369/32 |
| 5,301,174 | 4/1994 | Matoba et al. | 369/44.28 |

FOREIGN PATENT DOCUMENTS 2173987 7/1990 Japan ..................... 369/32

Primary Examiner—Georgia Y. Epps
Assistant Examiner—Tan Dinh
Attorney, Agent, or Firm—Staas & Halsey

[57] ABSTRACT

An access control circuit for use in an optical disk unit including a linear drive mechanism for linearly sliding an optical head to thereby shift a beam spot to a target track on an optical disk. The slider of the linear drive mechanism and the optical head are integrally structured. The sliding speed of the linear drive mechanism is detected by a speed detection unit and the target speed of the linear drive mechanism is calculated by a target speed calculation unit. The difference between the sliding speed and the target speed is detected by a speed difference detection unit and thereby a speed difference signal is obtained. Then, the speed difference signal and a high-frequency signal from an oscillation unit are added together and the sum signal is output to a current supply unit, and thereby a drive current in accordance with the sum signal is supplied from the current supply unit to the linear drive mechanism to drive the same.

11 Claims, 14 Drawing Sheets

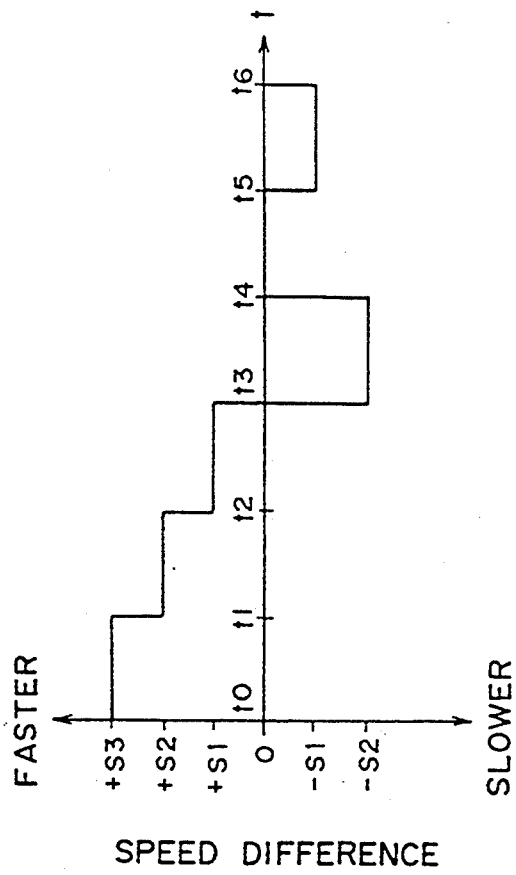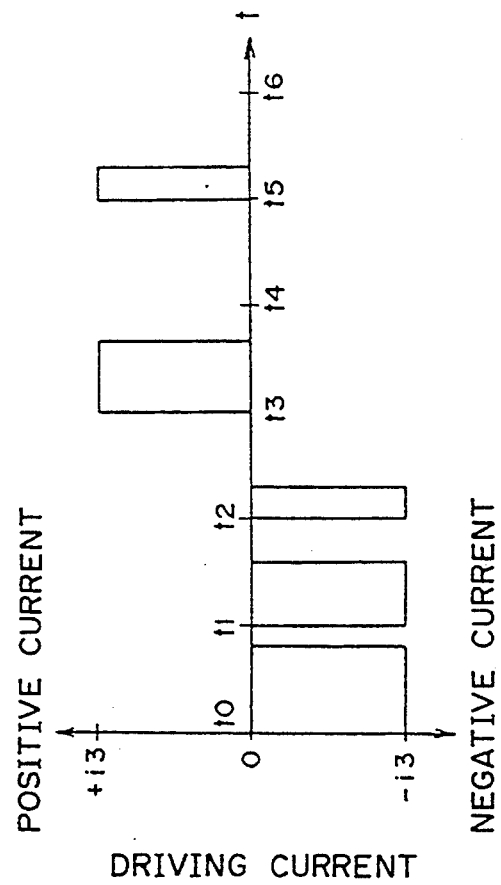
FIG. 2A PRIOR ART
FIG. 2B PRIOR ART

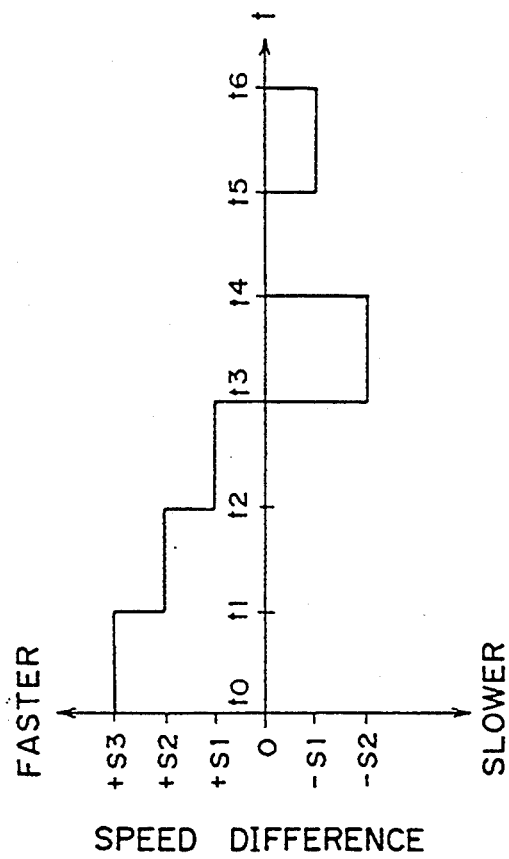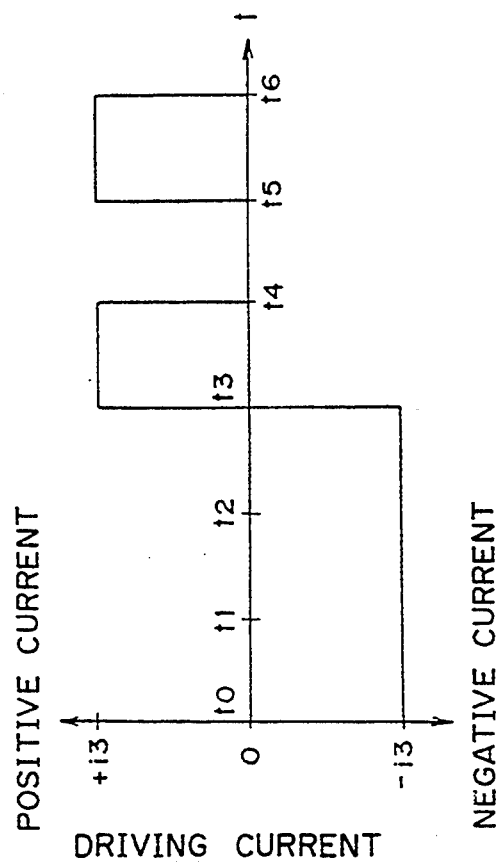
FIG. 3A PRIOR ART
FIG. 3B PRIOR ART

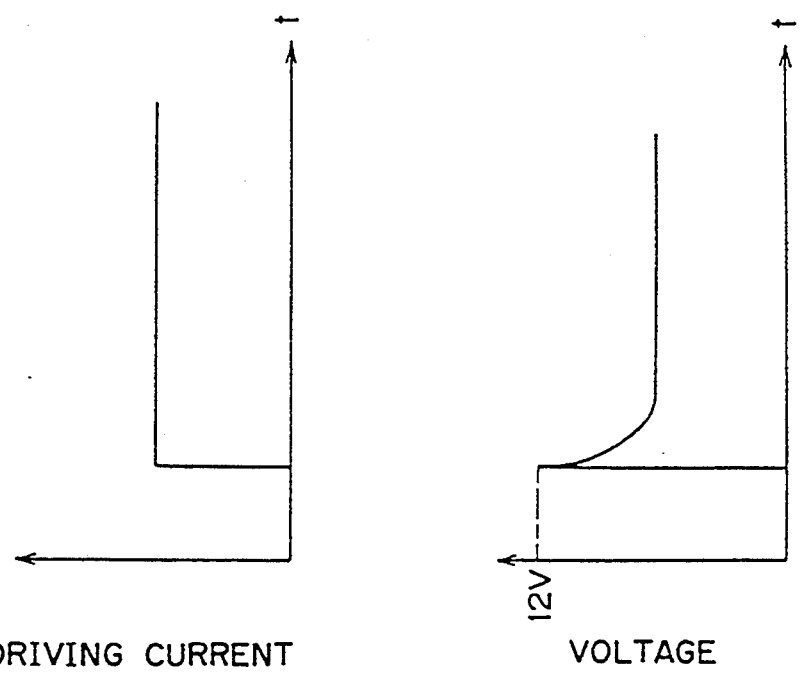

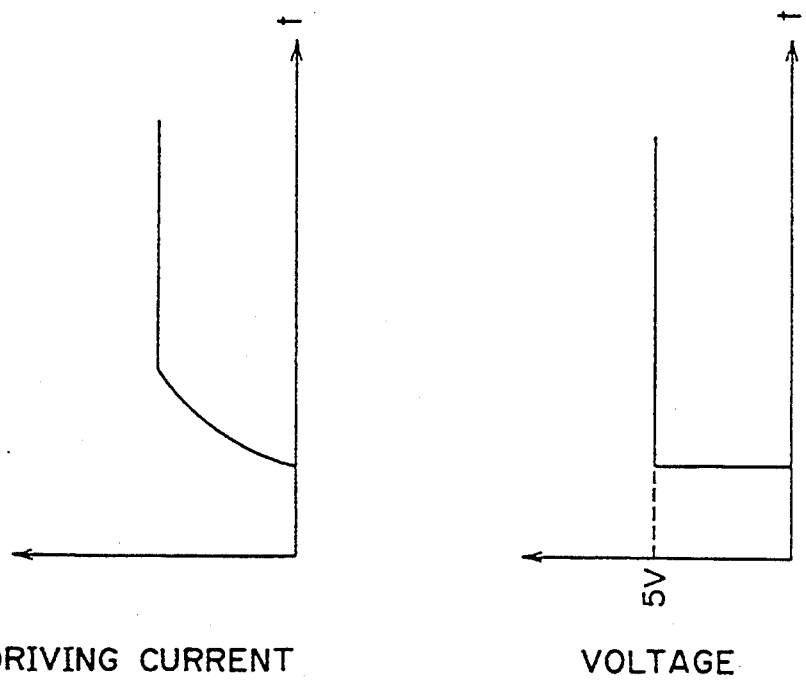

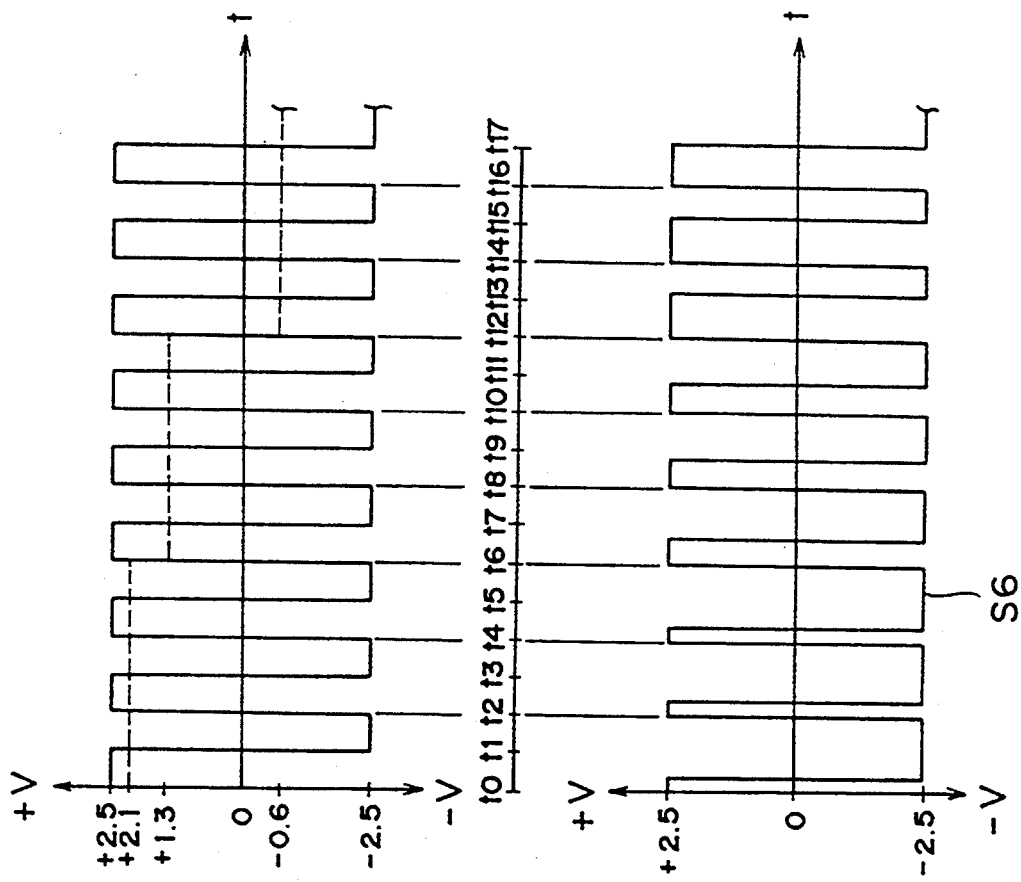

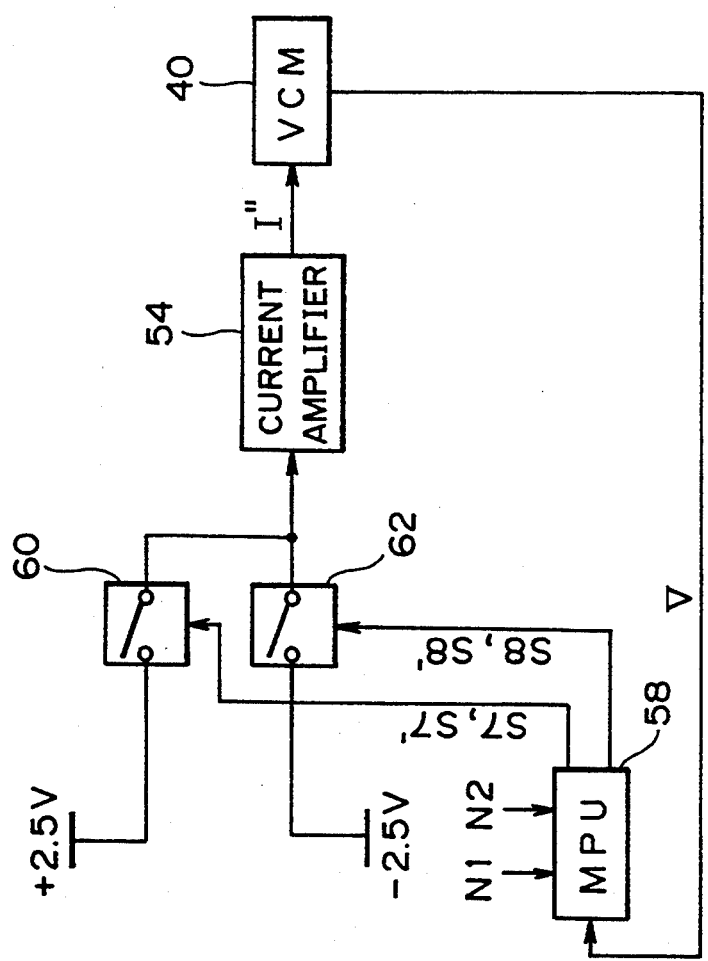

ACCESS CONTROL CIRCUIT FOR USE IN OPTICAL DISK UNIT

BACKGROUND OF THE INVENTION

1. Field of the Invention

The present invention relates to an access control circuit for use in an optical disk unit.

The term "optical disk unit" herein includes a magneto-optic disk unit.

2. Description of the Related Art

Recently, there have been developed not only an optical disk unit in which recorded ROM data is reproduced by irradiating a laser beam thereon but also a magneto-optic disk unit in which the user can write desired data into the disk. Such optical disk units are required to have an access control mechanism being small in size and yet capable of seeking out desired data quickly.

The control to locate a particular track in an optical disk unit consists of a slide mode in which the laser beam spot is shifted at a high speed in the radial direction to the target track on the optical disk and a tracking mode in which the beam spot, after being shifted, is kept to follow the target track. When irradiating the beam spot on the track of the optical disk, a laser beam from a light source is focused on the optical disk by means of an objective lens. The slide mode for shifting the beam spot to the target track is generally performed by linearly moving the optical head having the objective lens using a voice coil motor.

The voice coil motor is a linear motor which, when supplied with a drive current, operates such that its moving portion, or slider, makes a linear sliding motion. As the slider is moved, the head coupled with the slider is moved and, as a result, the beam spot is shifted in the radial direction of the optical disk. The number of tracks to be traversed is calculated from the difference between the target track number to be accessed and the current track number and, thereupon, the slider of the voice coil motor is moved such that the beam spot travels the distance corresponding to the calculated number of tracks. At this time, the voice coil motor makes the slide motion in a target speed according to target speeds preprogrammed for numbers of tracks to be traversed.

While the voice coil motor is making a sliding motion, the current sliding speed is detected, and a drive current in accordance with the difference between the detected current sliding speed and the target speed is supplied to the voice coil motor and, thereby, the voice coil motor makes the sliding motion in the target speed. Thus, the speed control in the accessing of the voice coil motor is basically executed such that the voice coil motor is decelerated when it is moving faster than the target speed and accelerated when it is moving slower than the target speed. The conventional access speed control methods include the following three methods.

A first method is such that the driving current supplied to the voice coil motor is changed according to the difference in speed between the current moving speed of the voice coil motor and the target speed. This method will be described below with reference to FIG. 1A and FIG. 1B.

For example, when it is assumed that the current speed of the voice coil motor is faster than the target speed by a speed difference of $+s3$ in the interval between the times t0 and t1 shown in FIG. 1A, the voice coil motor must be decelerated correspondingly. Therefore, a negative current of $-i3$ corresponding to the speed difference $+s3$ is supplied as the driving current to the voice coil motor as shown in FIG. 1B. Thereby, the voice coil motor is decelerated.

On the other hand, when it is assumed that the current speed of the voice coil motor is slower than the target speed by a speed difference of $-s2$ as indicated in the interval between the times t3 and t4 in FIG. 1A, the voice coil motor must be accelerated correspondingly. Therefore, a positive current of $+i2$ corresponding to the speed difference $-s2$ is supplied as the driving current to the voice coil motor as shown in FIG. 1B. Thereby, the voice coil motor is accelerated.

Further, when the current speed of the voice coil motor is equal to the target speed and the speed difference between them is zero as indicated in the interval between the times t4 and t5 in FIG. 1A, the driving current is set to zero as shown in FIG. 1B.

A second method is such that, while the value of the current supplied to the voice coil motor is kept constant, the time period during which the current is supplied is varied according to the speed difference. This method will be described below with reference to FIG. 2A and FIG. 2B.

For example, when the speed difference in the interval between the times t0 and t1 is $+s3$ as shown in FIG. 2A, the voice coil motor must be decelerated correspondingly. Therefore, a constant negative current of $-i3$ is supplied to the voice coil motor for a period of time corresponding to the speed difference $+s3$ as shown in FIG. 2B.

When the speed difference is $+s2$ smaller than $+s3$, the time period during which the constant negative current value $-i3$ is supplied is made shorter, as shown in FIG. 2B, than the time period during which the current was passed when the speed difference was $+s3$. Namely, control is made such that the time period during which the negative current $-i3$ is passed through the voice coil motor is made longer the greater the difference in speed for each unit time is. Also, when the speed difference is on the negative side, control is made such that the time period during which a positive current $+i3$ is passed through the voice coil motor is made longer the larger the speed difference on the negative side for each unit time is.

A third method is that called the BANG-BANG control. In this method, as shown in FIG. 3A and FIG. 3B, a maximum negative current $-i3$ is supplied to the voice coil motor when its speed is higher than the target speed, while a maximum positive current $+i3$ is supplied when the speed is lower than the target speed.

Recently, downsizing has come into fashion also in the field of optical disk units and the optical disk unit is tending to become smaller, thinner, and less power consuming. In the conventional voice coil motor, as shown in FIG. 4A and 4B, its moving portion (slider) 2 was supported by roller bearings 8 slidably contacting a pair of guide rails 6. The slider 2 is structured to be integral with an optical head having an objective lens 4. However, as the optical disk unit becomes smaller and thinner, the roller bearings supporting the slider becomes relatively thick. In order to advance the design for a smaller and thinner type, it becomes necessary not to employ a voice coil motor using roller bearings but to employ a voice coil motor, for example, of a slide-along-shaft type.

An optical head employing a voice coil motor of a slide-along-shaft type is schematically shown in FIG. 5A and FIG. 5B. A slider 10 of the voice coil motor is directly and slidably supported by a pair of guide rails 14. The slider 10 is structured to be integral with an optical head having an objective lens 12. As shown in FIG. 5B, the slider 10 is provided with yokes 16 and coils 18, while there is provided magnets 22 in the stator 20 in confronting relationship with the coils 18. The sliding speed and direction of the slider 10 is controlled by the value and direction of the current passed through the coils 18.

When such a slide-along-shaft type voice coil motor is employed, and if the access speed control method described with reference to FIG. 1A and FIG. 1B is used, the voice coil motor becomes suddenly slow or stopped by friction between the shaft and the slider when the drive current becomes small. Thus, there has been a problem that the voice coil motor is difficult to control when it is at a low speed.

Further, in order to realize a drive consuming low power, there is a tendency toward the use of a 5-volt single power source. In this case, since the voltage applied to a current amplifier for supplying the driving current to the voice coil motor is low, the current amplifier operates not in the current mode but in the voltage mode. For example, if the maximum voltage applicable to the current amplifier is 12 V as shown in FIG. 6B, the driving current output from the current amplifier immediately after the application of the voltage 12 V instantly rises to a preset current value capable of driving the voice coil motor as shown in FIG. 6A.

However, when the maximum voltage value applicable to the current amplifier is 5 V as shown in FIG. 7B, the preset current value cannot be reached unless a certain time has elapsed after the voltage 5 V has been applied as shown in FIG. 7A and, hence, the voice coil motor is held inoperative during this time.

Such trouble occurs immediately after the polarity of the driving current has been changed and also occurs when the method of control described with reference to FIG. 2A and FIG. 2B in which a constant current value is supplied for a period of time corresponding to the speed difference or the method of the BANG-BANG control described with reference to FIG. 3A and FIG. 3B is used. When such trouble occurs, it becomes unable to control the voice coil motor to provide a motion at the target speed, and hence quick access control of the beam spot becomes unachievable.

SUMMARY OF THE INVENTION

Accordingly, an object of the present invention is to provide an access control circuit for use in an optical disk unit in which a beam spot is quickly shifted to a target track on an optical disk even if a linear drive mechanism of a small-sized and low-voltage driven type is employed.

In accordance with an aspect of the present invention, there is provided an access control circuit for use in an optical disk unit including an optical disk having a plurality of circular tracks and an optical head for forming a beam spot on the optical disk comprising: linear drive means operatively connected with the optical head for linearly sliding the optical head so that the beam spot is shifted to a target track on the optical disk; speed detection means for detecting the sliding speed of the linear drive means; target speed calculation means for calculating a target speed of the linear drive means on the basis of a difference between a distance from a position of the beam spot at the start of the access to said target track and a number of tracks the beam spot has traversed; speed difference detection means operatively connected with the speed detection means and the target speed calculation means for detecting the difference between the sliding speed of the linear drive means detected by the speed detection means and the target speed to thereby output a speed difference signal; oscillation means for outputting a high-frequency signal at a predetermined period; adding means operatively connected with the oscillation means and the speed difference detection means for adding up the high-frequency signal and the speed difference signal; and driving current supply means operatively connected with the adding means and the linear drive means for supplying the linear drive means with a driving current for accelerating or decelerating the sliding speed of the linear drive means according to the output of the adding means.

Preferably, the linear drive means is a voice coil motor of a slide-along-shaft type and the optical head and the slider of the voice coil motor are integrally structured.

The target speed calculation means obtains a distance for the beam spot to travel from a difference between a distance from a position of the beam spot at the start of the access to said target track and a number of tracks the beam spot has traversed and calculates the target speed of the linear drive means by referring to a table according to the obtained distance.

In accordance with another aspect of the present invention, there is provided an access control circuit for use in an optical disk unit including an optical disk having a plurality of circular tracks and an optical head for forming a beam spot on the optical disk comprising: linear drive means operatively connected with the optical head for linearly sliding the optical head so that the beam spot is shifted to a target track on the optical disk; speed detection means for detecting the sliding speed of the linear drive means; target speed calculation means for calculating a target speed of the linear drive means on the basis of a difference between a distance from a position of the beam spot at the start of the access to said target track and a number of tracks the beam spot has traversed; speed difference detection means operatively connected with the speed detection means and the target speed calculation means for detecting the difference between the sliding speed of the linear drive means detected by the speed detection means and the target speed to thereby output a speed difference signal; oscillation means for outputting a high-frequency rectangular-wave signal at a predetermined period; duty ratio control means operatively connected with the oscillation means and the speed difference detection means for controlling the duty ratio of the high-frequency rectangular-wave signal according to the speed difference signal and alternately outputting accelerating pulse and decelerating pulse; and driving current supply means operatively connected with the duty ratio control means and the linear drive means for supplying the linear drive means with a driving current for accelerating or decelerating the sliding speed of the linear drive means according to the output of the duty ratio control means.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 2A and FIG. 2B are diagrams explanatory of another conventional access speed control method;

FIG. 3A and FIG. 3B are diagrams explanatory of a further conventional access speed control method;

FIG. 6A and FIG. 6B are diagrams explanatory of a current amplifier operating in a current mode;

FIG. 7A and FIG. 7B are diagrams explanatory of a current amplifier operating in a voltage mode;

FIG. 13A is a diagram showing voltage waveforms of a speed difference signal and a clock signal generated within the MPU in the second embodiment;

FIG. 13B is a diagram showing a voltage waveform of an output signal from a D/A converter in the second embodiment; and FIG. 14 is a block diagram of an access control circuit for use in an optical disk unit according to a third embodiment of the present invention.

DESCRIPTION OF THE PREFERRED EMBODIMENTS

Figure 1A:
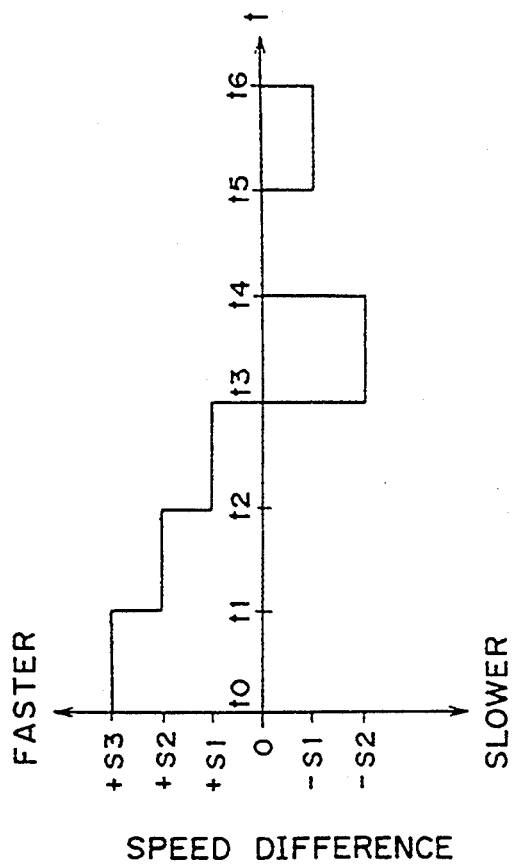
FIG. 1A and FIG. 1B are diagrams explanatory of a conventional access speed control method.
Figure 1B:
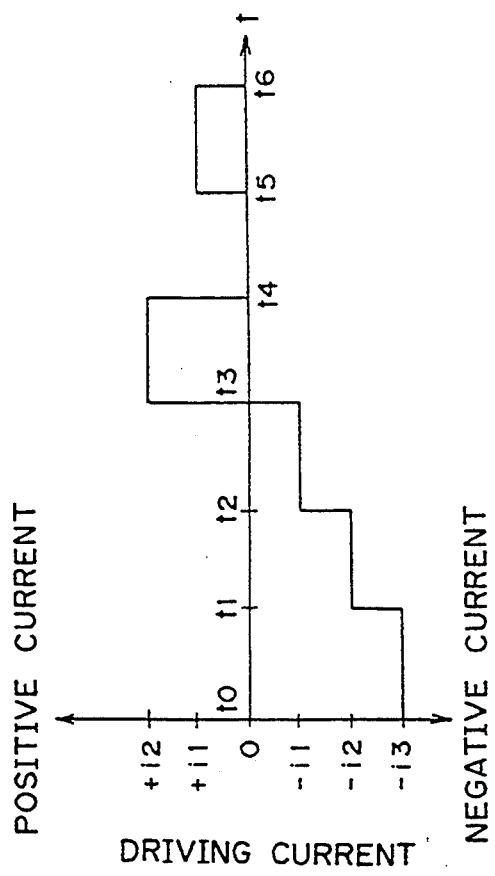
Figure 4A:
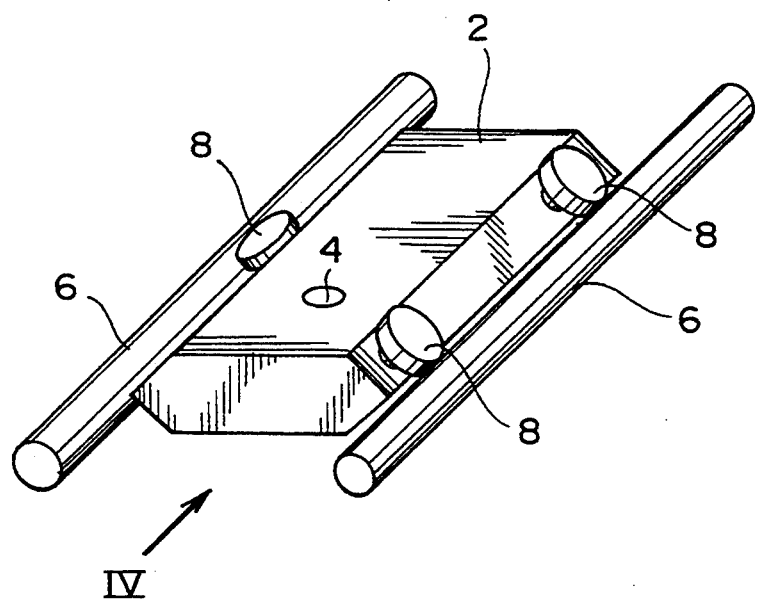
FIG. 4A is a perspective view schematically showing a voice coil motor of a bearing-supported type.
Figure 4B:
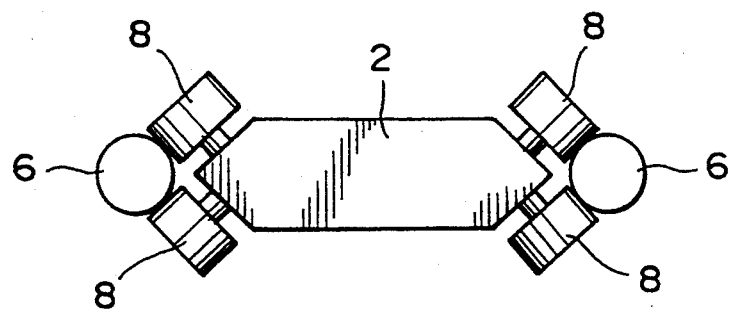
FIG. 4B is a view as viewed in the direction of the arrow IV in FIG. 4A.
Figure 5A:
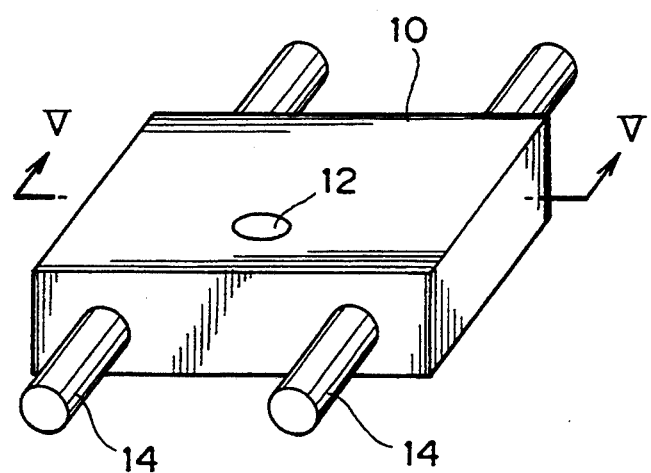
FIG. 5A is a perspective view schematically showing a voice coil motor of a slide-along-shaft type.
Figure 5B:
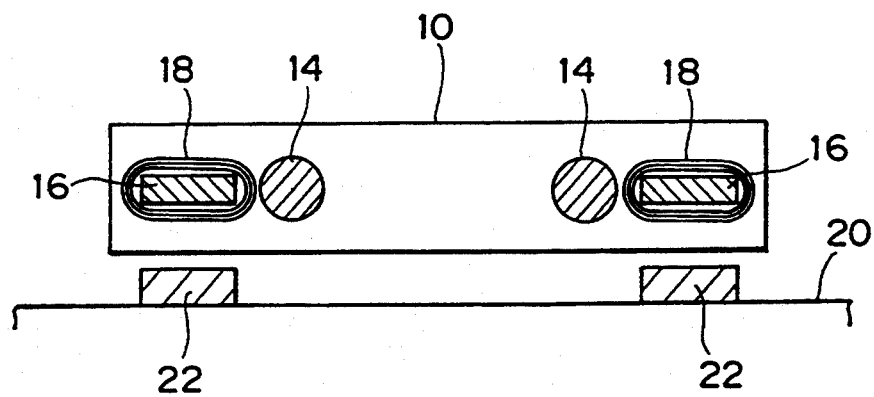
FIG. 5B is a cross-sectional view taken along the line V—V in FIG. 5A schematically showing a relationship between coils and magnets.
Figure 8:
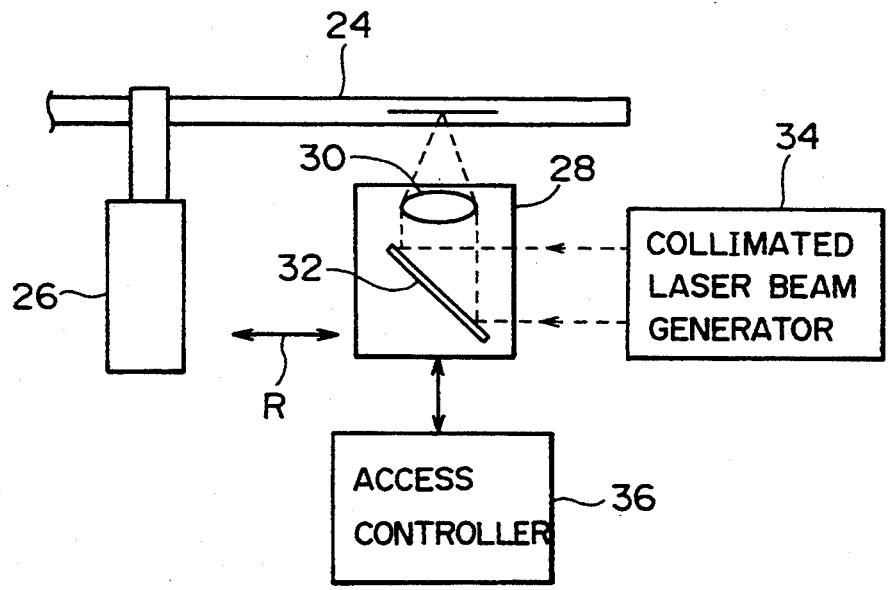
FIG. 8 is a schematic diagram showing a relationship between an optical disk and an optical head.

Referring now to FIG. 8, an optical disk or magneto-optic disk 24 is rotated by a motor 26. On the optical disk 24, there are formed a plurality of circular tracks for example spirally. A beam spot is focused on a selected track by an objective lens 30 mounted on an optical head 28 so that data writing or reading is performed. A collimated beam from a collimated laser beam generator 34 having a laser diode and a collimator lens is reflected by a mirror 32 and focused on the selected track on the optical disk 24 by the objective lens 30. The optical head 28 is structured to be integral with the slider of a voice coil motor of a slide-along-shaft type shown in FIG. 5A and FIG. 5B and shifted in the radial direction of the optical disk 24, i.e., in the direction of the arrow R. The access of the optical head 28 to the target track is controlled by an access controller 36 which will be described later in detail.

Figure 9:
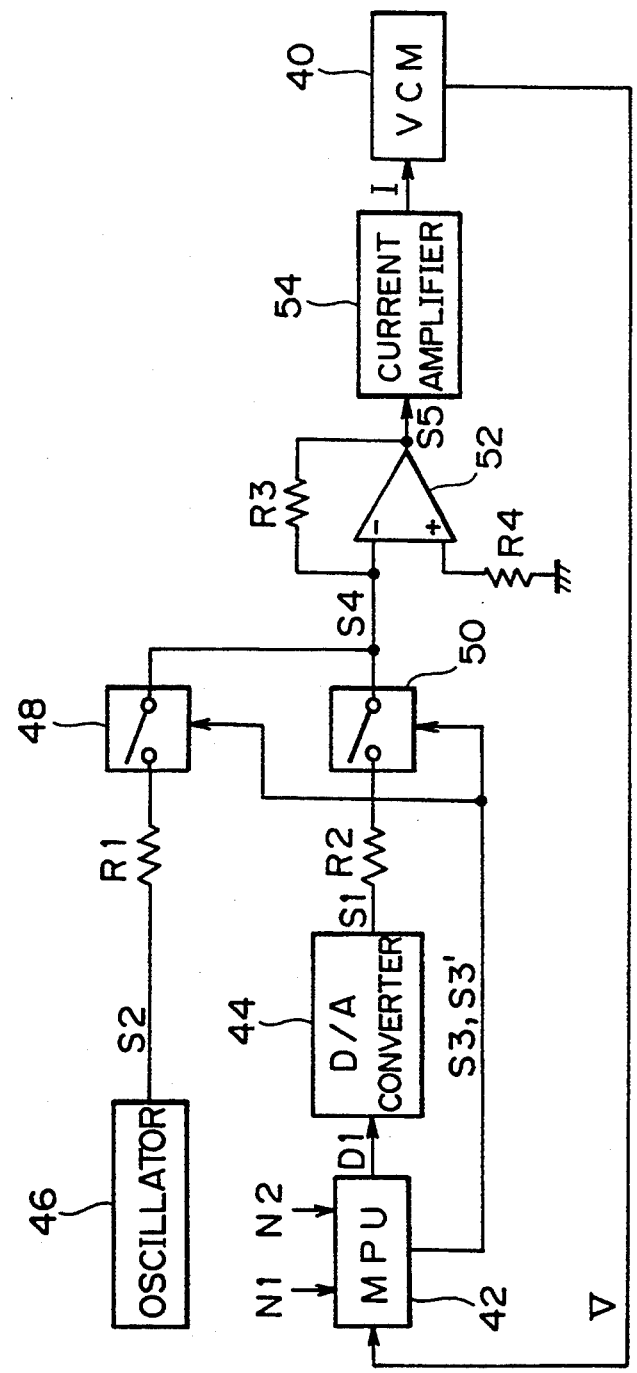
FIG. 9 is a block diagram showing an access control circuit for use in an optical disk unit according to a first embodiment of the present invention.

Referring now to FIG. 9, an access control circuit of a first embodiment of the present invention will be described. Reference numeral 40 denotes a voice coil motor of a slide-along-shaft type shown in FIG. 5A and FIG. 5B, of which the slider is moved depending on a drive current I supplied from a current amplifier 54, so that a beam spot is irradiated on a target track of the optical disk 24 by the optical head 28 structured to be integral with the slider.

Reference numeral 42 denotes a microprocessing unit (MPU) which outputs speed difference data D1 for controlling the traveling distance and traveling speed of the voice coil motor 40 so that the beam spot is shifted to a target track. The MPU 42 calculates the number of tracks to be traversed from a difference between the target track number N1 to which the beam spot is to be shifted and the number N2 of the track on which the beam spot is being currently irradiated and thereby obtains the distance the slider of the voice coil motor 40 has to travel. In other words, a difference between the target track number N1 and the track number on which the beam spot is formed at the start of the access is set to a counter. The counter is decremented whenever the beam spot moves across each track and therefore counter value represents the number of tracks or distance to be traversed for the beam spot. It further obtains the target speed of the voice coil motor 40 corresponding to the distance to be traveled by retrieving it from a preprogrammed target speed table. Further, the MPU 42 detects the current traveling speed V of the voice coil motor 40, and obtains a difference between the detected traveling speed V and the earlier obtained target speed, and thus obtains and outputs the speed difference data D1. The speed difference data D1 is converted into an analog signal in a D/A converter 44 and output therefrom as a speed difference signal S1.

Reference numeral 46 denotes an oscillator which outputs a high-frequency rectangular-wave signal S2 for example at a frequency of 30 KHz. Switches 48 and 50 are brought into on/off states by on/off signals S3 and S3' output from the MPU 42. When the MPU 42 executes control to move the voice coil motor 40, the MPU 42 outputs the on signal S3 to turn on the switches 48 and 50, and in the case to the contrary, it outputs the off signal S3' to turn off the switches.

Reference numeral 52 denotes an operational amplifier supplied with +2.5 V as the positive power supply voltage and −2.5 V as the negative power supply voltage, and its inverting input "−" is connected with its output terminal through a resistor R3 and its non-inverting input "+" is grounded through a resistor R4. Namely, the operational amplifier 52 functions as an inverting amplifier. When a sum signal S4 obtained by adding up the output signal S2 of the oscillator 46 sent over through a resistor R1 and the switch 48 and the output signal S1 of the D/A converter 44 sent over through a resistor R2 and the switch 50 is supplied to the inverting input "−" of the operational amplifier 52, an inverted-amplified signal S5 of the sum signal S4 is output from the operational amplifier 52.

Figure 10:
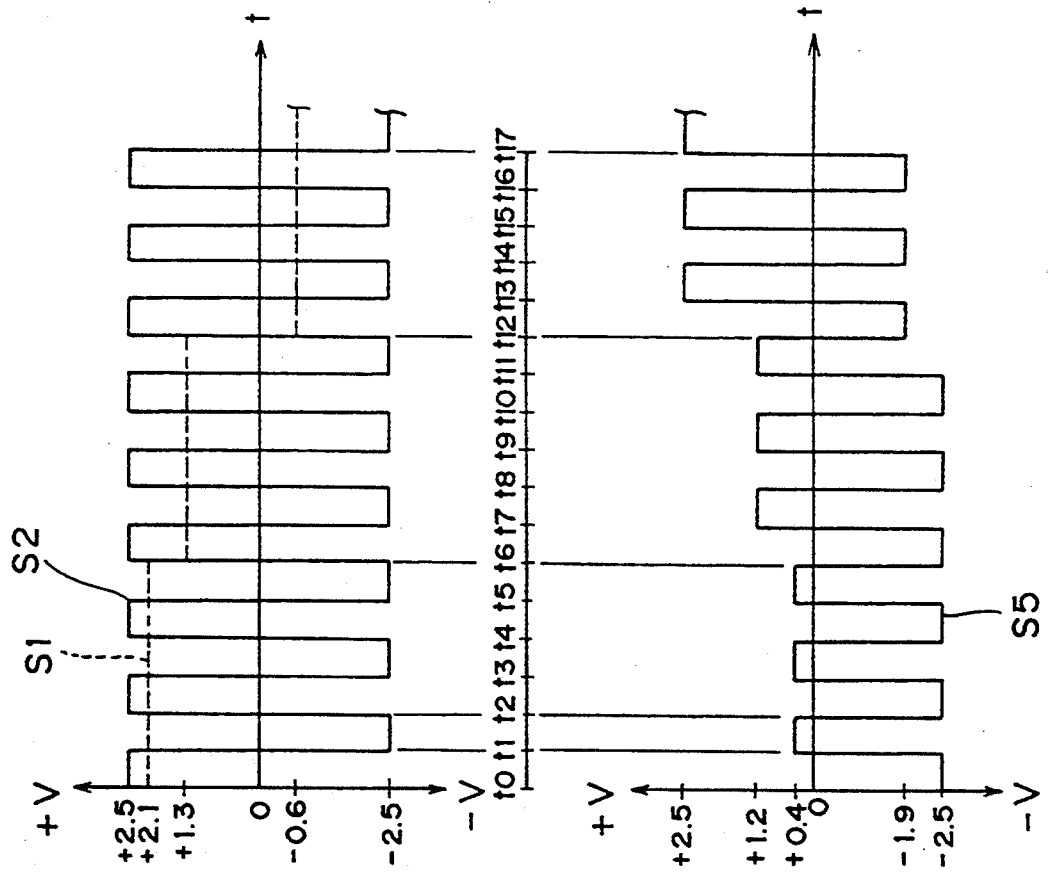
FIG. 10A is a diagram showing voltage waveforms of an output signal from a D/A converter and an output signal from an oscillator in the first embodiment.
FIG. 10B is a diagram showing a voltage waveform of an output signal from an operational amplifier in the first embodiment.

Referring to FIG. 10A, there are shown the waveform of the output signal S2 of the oscillator 46 in solid line and the waveform of the output signal S1 of the D/A converter 44 in broken line. The output signal S1 corresponds to the speed difference data D1 output from the MPU 42 as described above. The signal S2 is a rectangular wave oscillating to positive voltage side/negative voltage side with 0 V taken as a reference at a constant period and it is so set for example that the maximum positive voltage value is +2.5 V and the maximum negative voltage value is −2.5 V. Since the signal S1 corresponds to the speed difference data D1, it varies with time t. Here, it is assumed that the voltage is +2.1 V in the interval between times t0 and t6, +1.3 V in the interval between times t6 and t12, and −0.6 V in the interval between times t12 and t17.

Such signals S2 and S1 are added up on the output side of the switches 48 and 50 and the sum signal S4 is inverted-amplified in the operational amplifier 52 so that a signal waveform S5 as shown in FIG. 10B is obtained. For easiness of comparison between signal waveforms before amplification and after amplification here, the amplification factor of the operational amplifier 52 is assumed to be "1". More specifically, in the interval between the times t0 and t1, the signal S2 with the voltage value +2.5 V and the signal S1 with the voltage value +2.1 V shown in FIG. 10A are added but the sum becomes +2.5 V because the maximum value is +2.5 V. As a result, the voltage value of the output signal S5 of the operational amplifier 52 becomes −2.5 V, the inverted value of +2.5 V, as shown in FIG. 10B. In the interval between the times t1 and t2, the voltage value −2.5 V and voltage value +2.1 V are added and, hence, the voltage value of the output voltage S5 becomes +0.4 V, the inverted value of the sum of −2.5 V and +2.1 V. For each of the time intervals that follow, the signal S2 and signal S1 are added and inverted so that the signal S5 of the waveform as shown in FIG. 10B is output from the operational amplifier 52.

Referring back to FIG. 9, the output signal S5 of the operational amplifier 52 is supplied to the current amplifier 54 and the current amplifier 54 supplies a driving current I corresponding to the output signal S5 to the voice coil motor 40. The voice coil motor 40 moves at the target speed in accordance with the driving current I. More specifically, since the driving current I flows correspondingly to the waveform shown in FIG. 10B, if it is seen macroscopically, the driving current I corresponds to the speed difference signal D1, output from the MPU 42, as the control signal for accelerating-/decelerating the speed of the voice coil motor 40. Accordingly, the voice coil motor 40 moves at the target speed.

On the other hand, if it is seen microscopically, when the voice coil motor 40 is to be decelerated, a maximum decelerating current is passed through the voice coil motor 40 in the period corresponding to ½ period of the high-frequency signal S2 to cause the motor to be decelerated in a maximum degree, and when the voice coil motor 40 is to be accelerated, a maximum accelerating current is passed through the voice coil motor 40 in the period corresponding to ½ period of the high-frequency signal S2 to cause the motor to be accelerated in a maximum degree. Therefore, such a difficulty encountered in the conventional art that the voice coil motor 40 comes to be stopped because a small positive or negative driving current is continuously supplied to it for a certain period of time can be overcome.

Further, the effect to slow down the rise of the driving current at a switchover between accelerating current/decelerating current is lessened the shorter the period of time, during which the current in the direction before the switchover is passed, is. Therefore, also from this reason, it is advantageous to alternate acceleration/deceleration at a short period. According to the first embodiment described above, even if the voice coil motor 40 is of a slide-along-shaft type and it is of the type driven by a low voltage using a single power source of 5 V, such a difficulty encountered in the conventional art that the voice coil motor comes to be suddenly slowed down or stopped due to friction between the shaft and the slider can be overcome, and hence proper speed control can be achieved even when the speed of the voice coil motor is low. Accordingly, the beam spot can be quickly shifted to the target track on the optical disk.

Although it was described in the above description of the first embodiment such that the signal waveform oscillates between +2.5 V and −2.5 V with 0 V taken as a reference, it was described so just for convenience of explanation. In reality, when a single power supply of 5 V is used, each signal wave oscillates between 0 V and 5 V with 2.5 V taken as a reference. The same rule correspondingly applies to below described second and third embodiments.

Figure 11:
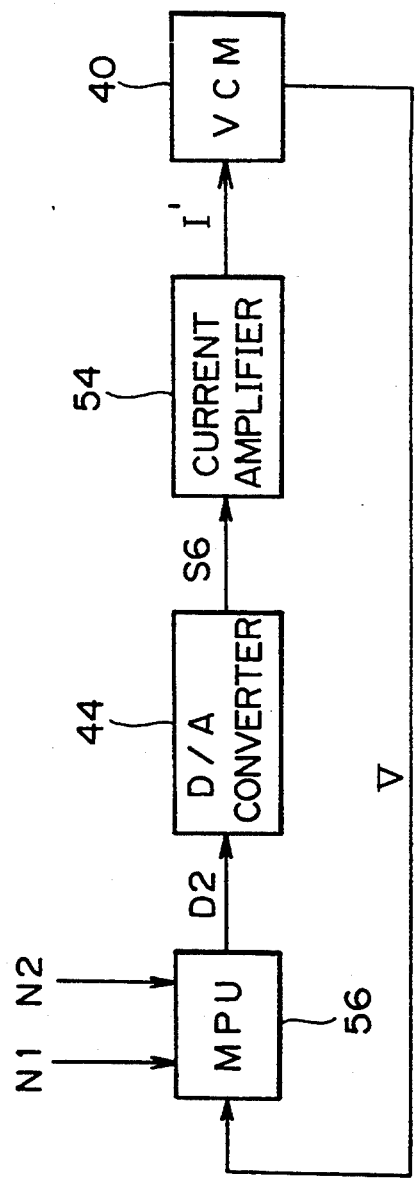
FIG. 11 is a block diagram of an access control circuit for use in an optical disk unit according to a second embodiment of the present invention.
Figure 12:
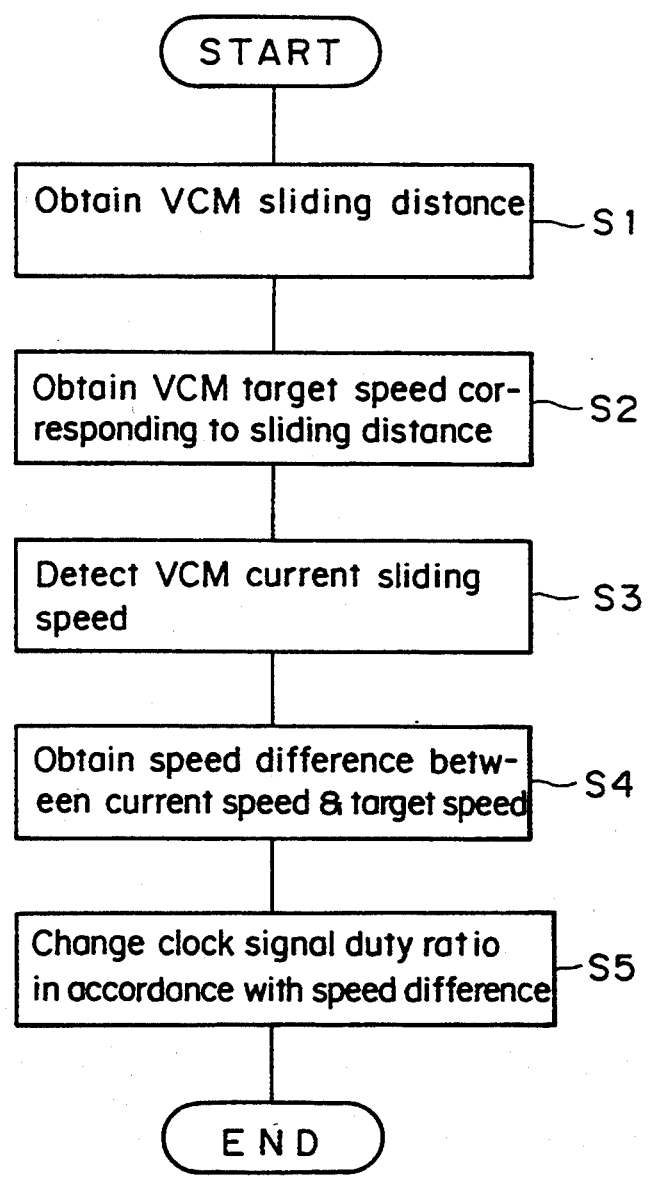
FIG. 12 is a flow chart showing operations of an MPU in the second embodiment.

Referring now to FIG. 11, there is shown a block diagram of an access control circuit of a second embodiment of the present invention. In the description of the present embodiment, component parts thereof substantially the same as those in the first embodiment shown in FIG. 9 will be denoted by like reference numerals and description thereof will be omitted to avoid duplication. The MPU 56 in the present embodiment outputs a speed control data D2 for controlling the sliding distance and sliding speed of the voice coil motor 40 to shift the beam spot to the target track on the optical disk. The operation of the MPU 56 will be described with reference to a flow chart of FIG. 12.

First in step S1, the sliding distance of the voice coil motor 40 is obtained by calculating the number of tracks to be traversed from the difference between the target track number N1 and the current track number N2. In step S2, the target speed of the voice coil motor 40 corresponding to the sliding distance is obtained by retrieving it from a preprogrammed target speed table.

In step S3, the current sliding speed V of the voice coil motor 40 is detected and, in step S4, the speed difference is obtained by taking the difference between the detected sliding speed V and the earlier obtained target speed. Then, in step S5, the duty ratio of the clock signal which is oscillated at 30 KHz by an oscillator provided within the MPU 56 is changed in accordance with the earlier obtained speed difference, and this signal is output as speed control data D2.

Referring now to FIG. 13A, there are shown a voltage waveform of the clock signal in solid line and a waveform of the speed difference expressed in voltage in broken line. In changing, in the MPU 56, the duty ratio of the clock signal in accordance with the speed difference, the duty ratio of the deceleration pulse for decelerating the voice coil motor 40 is made greater when the current speed is higher than the target speed. Conversely, the duty ratio of the acceleration pulse for accelerating the voice coil motor 40 is made greater when the current speed is lower than the target speed.

The voltage waveform of an analog signal S6 obtained by conversion of the speed control data D2 formed of the accelerating pulses and decelerating pulses in the D/A converter 44 is shown in FIG. 13B. As apparent from the relationship between FIG. 13A and FIG. 13B, the sliding speed V of the voice coil motor 40 in the interval between the times t0 and t6 is higher than the target speed and the voltage value corresponding to the speed difference is +2.1 V as indicated by the broken line. In this case, the duty ratio of the decelerating pulse within one period of the clock signal is increased to the duty ratio to decelerate the voice coil motor 40 to the target speed. As a result, the duty ratio of a negative voltage −2.5 V of the analog signal S6 as the decelerating pulse for one period of the clock signal is increased as shown in FIG. 13B.

Also in the interval between the times t6 and t12, the sliding speed V of the voice coil motor 40 is higher than the target speed and the voltage value corresponding to the speed difference is at +1.3 V. Hence, as shown in FIG. 13B, the duty ratio of the negative voltage −2.5 V of the analog signal S6 is increased. However, since the speed difference in the interval between the times t6 and t12 is smaller than the speed difference in the interval between the times t0 and t6, the duty ratio of the negative voltage −2.5 V of the analog signal S6 is made smaller than the duty ratio in the interval between the times t0 and t6.

The sliding speed V of the voice coil motor 40 in the interval between the times t12 and t17 is lower than the target speed and the voltage value corresponding to the speed difference is −0.6 V. Hence, the duty ratio of the acceleration pulse within one period of the clock signal is increased to a suitable duty ratio for accelerating the voice coil motor 40 to the target speed. Accordingly, as shown in FIG. 13B, the duty ratio of a positive voltage +2.5 V of the analog signal S6 as the acceleration pulse for each period of the clock signal is increased. By application of the analog signal S6 as shown in FIG. 13B to the current amplifier 54, a driving current I' corresponding to the analog signal S6 is supplied to the voice coil motor 40 and thereby the voice coil motor 40 is controlled so that its sliding speed V is brought to the target speed.

More specifically, when the voice coil motor 40 is to be decelerated, a maximum decelerating current corresponding to the high-frequency clock signal with the duty ratio of the decelerating pulse increased is supplied to the voice coil motor 40 and thereby the voice coil motor 40 is decelerated. When the voice coil motor 40 is to be accelerated, a maximum accelerating current corresponding to the high-frequency clock signal with the duty ratio of the accelerating pulse increased is supplied to the voice coil motor 40 and thereby the voice coil motor 40 is accelerated. Accordingly, such a difficulty encountered in the conventional art that the voice coil motor is suddenly slowed down or stopped due to friction between the shaft and the slider can be overcome and hence proper speed control is achieved even when the voice coil motor is operated at a low speed. Accordingly, the beam spot can be quickly shifted to the target track on the optical disk.

Referring now to FIG. 14, there is shown a block diagram of an access control circuit of a third embodiment of the present invention. In the description of the present embodiment, component parts substantially the same as those in the second embodiment shown in FIG. 11 will be denoted by like reference numerals and description of the same will be omitted to avoid duplication.

In this third embodiment, the same as in the second embodiment, it is adapted such that the sliding speed of the voice coil motor 40 is controlled by supplying the maximum accelerating current and the maximum decelerating current to the voice coil motor 40. However, it is different from the second embodiment in that the voltage of the waveform as shown in FIG. 13B is applied to the current amplifier 54 by on/off control of a first and a second switch 60 and 62 by the MPU 58.

The MPU 58 obtains the sliding distance of the voice coil motor 40 by calculating the number of tracks to be traversed from the difference between the target track number N1 and the current track number N2. It obtains the target speed of the voice coil motor 40 corresponding to the sliding distance by retrieving it from a preprogrammed speed table. Then, it detects the current sliding speed V of the voice coil motor 40 and obtains the speed difference by taking the difference between the detected sliding speed V and the earlier obtained target speed. Then, the duty ratio of the accelerating pulse or the decelerating pulse of the clock signal which is oscillated at 30 KHz by an oscillator provided within the MPU 58 is changed in accordance with the earlier obtained speed difference.

The MPU 58 outputs first on/off signals S7 and S7' according to the accelerating pulse with its duty ratio controlled and also outputs second on/off signals S8 and S8' according to the decelerating pulse with its duty ratio controlled. Since the accelerating pulse and the decelerating pulse are arranged to be generated alternately, the second off signal S8' is output while the first on signal S7 as the accelerating pulse is output, and the first off signal S7' is output while the second on signal S8 as the decelerating pulse is output.

Accordingly, by such operation that the second switch 62 is turned off while the first switch 60 is turned on and the first switch 60 is turned off while the second switch 62 is turned on, the voltage of the waveform as shown in FIG. 13B is applied to the current amplifier 54. Thus, a driving current I" corresponding to the applied voltage is supplied to the voice coil motor 40 so that the sliding speed V of the voice coil motor 40 is controlled to become the target speed.

What is claimed is:

1. An access control circuit for use in an optical disk unit including an optical disk having a plurality of circular tracks and an optical head for forming a beam spot on said optical disk comprising:

linear drive means operatively connected with said optical head for linearly sliding said optical head so that the beam spot is shifted to a target track on said optical disk;

speed detection means for detecting a sliding speed of said linear drive means;

target speed calculation means for calculating a target speed of said linear drive means on the basis of a difference between a distance from a position of the beam spot at the start of the access to said target track and a number of tracks the beam spot has traversed;

speed difference detection means operatively connected with said speed detection means and said target speed calculation means for detecting a difference between the sliding speed of said linear drive means detected by said speed detection means and said target speed to thereby output a speed difference signal;

oscillation means for outputting a high-frequency signal at a predetermined period;

adding means operatively connected with said oscillation means and said speed difference detection means for adding up said high-frequency signal and said speed difference signal; and driving current supply means operatively connected with said adding means and said linear drive means for supplying said linear drive means with a driving current for accelerating or decelerating the sliding speed of said linear drive means according to the output of said adding means.

2. An access control circuit according to claim 1, wherein said linear drive means is a voice coil motor including a stator and a slider operatively coupled with said optical head.

3. An access control circuit according to claim 2, wherein said optical head is structured to be integral with said slider.

4. An access control circuit according to claim 3, wherein said voice coil motor is of a slide-along-shaft type in which said slider slides along a pair of guide shafts.

5. An access control circuit according to claim 1, wherein said target speed calculation means obtains a distance for the beam spot to travel from a difference between a distance from a position of the beam spot at the start of the access to said target track and a number of tracks the beam spot has traversed and calculates the target speed of said linear drive means according to the obtained distance.

6. An access control circuit for use in an optical disk unit including an optical disk having a plurality of circular tracks and an optical head for forming a beam spot on said optical disk comprising:

linear drive means operatively connected with said optical head for linearly sliding said optical head so that the beam spot is shifted to a target track on said optical disk;

speed detection means for detecting a sliding speed of said linear drive means;

target speed calculation means for calculating a target speed of said linear drive means on the basis of a difference between a distance from a position of the beam spot at the start of the access to said target track and a number of tracks the beam spot has traversed;

speed difference detection means operatively connected with said speed detection means and said target speed calculation means for detecting a difference between the sliding speed of said linear drive means detected by said speed detection means and said target speed to thereby output a speed difference signal;

oscillation means for outputting a high-frequency rectangular-wave signal at a predetermined period;

duty ratio control means operatively connected with said oscillation means and said speed difference detection means for controlling the duty ratio of said high-frequency rectangular-wave signal according to the speed difference signal and alternately outputting accelerating pulse and decelerating pulse; and driving current supply means operatively connected with said duty ratio control means and said linear drive means for supplying said linear drive means with a driving current for accelerating or decelerating the sliding speed of said linear drive means according to the output of said duty ratio control means.

7. An access control circuit according to claim 6, wherein said linear drive means is a voice coil motor including a stator and a slider operatively coupled with said optical head.

8. An access control circuit according to claim 7, wherein said optical head is structured to be integral with said slider.

9. An access control circuit according to claim 8, wherein said voice coil motor is of a slide-along-shaft type in which said slider slides along a pair of guide shafts.

10. An access control circuit according to claim 6, wherein said target speed calculation means obtains a distance for the beam spot to travel from a difference between a distance from a position of the beam spot at the start of the access to said target track and a number of tracks the beam spot has traversed and calculates the target speed of said linear drive means according to the obtained distance.

11. An access control circuit according to claim 6, wherein said duty ratio control means controls so as to increase the duty ratio of the accelerating pulse when the current sliding speed is lower than the target speed and to increase the duty ratio of the decelerating pulse when the current sliding speed is higher than the target speed.

* * * * *